United States Patent
Lee et al.

(10) Patent No.: US 10,194,422 B2
(45) Date of Patent: Jan. 29, 2019

(54) SIGNAL TRANSMISSION AND RECEPTION METHOD IN WIRELESS COMMUNICATION SYSTEM SUPPORTING CARRIER AGGREGATION, AND DEVICE FOR SAME

(71) Applicant: LG Electronics Inc., Seoul (KR)

(72) Inventors: Seungmin Lee, Seoul (KR); Hanbyul Seo, Seoul (KR); Byounghoon Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 13 days.

(21) Appl. No.: 15/503,062

(22) PCT Filed: Sep. 1, 2015

(86) PCT No.: PCT/KR2015/009182
§ 371 (c)(1),
(2) Date: Feb. 10, 2017

(87) PCT Pub. No.: WO2016/036103
PCT Pub. Date: Mar. 10, 2016

(65) Prior Publication Data
US 2017/0238296 A1    Aug. 17, 2017

Related U.S. Application Data

(60) Provisional application No. 62/044,408, filed on Sep. 1, 2014.

(51) Int. Cl.
*H04W 72/04* (2009.01)
*H04L 1/18* (2006.01)
(Continued)

(52) U.S. Cl.
CPC .......... *H04W 72/0406* (2013.01); *H04L 1/18* (2013.01); *H04L 1/1861* (2013.01); *H04L 5/00* (2013.01);
(Continued)

(58) Field of Classification Search
CPC ......... H04W 72/0406; H04W 72/1273; H04W 72/1268; H04W 72/0446; H04L 5/0055; H04L 1/1861
See application file for complete search history.

(56) References Cited

U.S. PATENT DOCUMENTS

2012/0064935 A1 * 3/2012 Hakola ................. H04W 72/02
                                                    455/513
2012/0230273 A1    9/2012 He et al.
(Continued)

FOREIGN PATENT DOCUMENTS

| KR | 1020130093562 A | 8/2013 |
| WO | 2013137677 A1 | 9/2013 |
| WO | 2013166712 A1 | 11/2013 |

OTHER PUBLICATIONS

Huawei, HiSilicon: "Extending PUCCH on PCell and pSCell to Carrier Aggregation", 3GPP TSG RAN WG1 Meeting #77, R1-142337, May 19-23, 2014.
(Continued)

*Primary Examiner* — Mounir Moutaouakil
(74) *Attorney, Agent, or Firm* — Dentons US LLP

(57) ABSTRACT

The present invention relates to a signal transmission and reception method and device using a plurality of cells of a terminal in a wireless communication system supporting a carrier aggregation. Particularly, the signal transmission and reception method comprises the steps of: receiving transmission control information for a primary cell (PCell) and a secondary cell (SCell) according to uplink-downlink configuration difference from each other, transmitting and receiving a signal in a specific time period according to the transmission control information; and performing a signal transmission and reception operation according to a pre-
(Continued)

defined configuration when a signal transmission in a specific time period is not indicated in the transmission control information.

8 Claims, 9 Drawing Sheets

(51) Int. Cl.
    *H04L 5/00*     (2006.01)
    *H04W 72/12*     (2009.01)

(52) U.S. Cl.
    CPC ............ *H04L 5/001* (2013.01); *H04L 5/0055* (2013.01); *H04W 72/1268* (2013.01); *H04W 72/1273* (2013.01); *H04W 72/0446* (2013.01)

(56) References Cited

U.S. PATENT DOCUMENTS

| | | | |
|---|---|---|---|
| 2012/0320840 A1* | 12/2012 | Kim | H04L 5/001 370/329 |
| 2012/0327821 A1* | 12/2012 | Lin | H04W 72/048 370/280 |
| 2013/0136108 A1* | 5/2013 | Cheng | H04L 1/1861 370/336 |
| 2013/0195066 A1* | 8/2013 | Lee | H04W 52/04 370/329 |
| 2013/0208634 A1 | 8/2013 | Ji et al. | |
| 2014/0029490 A1* | 1/2014 | Kim | H04L 5/1469 370/280 |
| 2014/0198752 A1 | 7/2014 | Hsieh et al. | |
| 2017/0373800 A1* | 12/2017 | Lee | H04L 1/1893 |

OTHER PUBLICATIONS

Qualcomm Incorporated: "Remaining details for PUCCH on SCell", 3GPP TSG RAN WG1 #78, R1-142953, Aug. 18-22, 2014.

Texas Instruments: "Prioritization of UL Channels for Dual Connectivity", 3GPP TSG RAN WG1 #78, R1-143284, Aug. 18-22, 2014.

CATT: "Design of TDD Inter-brand Carrier Aggregation," 3GPP TSG RAN WG1 Meeting #67, Nov. 14-18, 2011, R1-113724.

LG Electronics: "Overall issues on half-duplex operation based TDD CA with different UL-DL configurations," 3GPP TSG RAN WG1 #68, Feb. 6-10, 2012, R1-120421.

LG Electronics: "Issues on half-duplex based CA with different TDD UL-DL configurations," 3GPP TSG RAN WG1 #70, Aug. 13-17, 2012, R1-123507.

Huawei, HiSilicon: "Half duplex operation for TDD inter-band CA with different UL-DL configurations," 3GPP TSG RAN WG1 Meeting #71, Nov. 12-16, 2012, R1-124685.

New Postcom: Half duplex operation for determining the transmission direction of overlapped subframes for inter-band CA, 3GPP TSG RAN WG1 Meeting #71, Nov. 12-16, 2012, R1-124950.

Nokia Siemens Networks, Nokia Corporation: "Half duplex operation with inter-band CA with different TDD configurations on different bands," 3GPP TSG-RAN WG1 Meeting #71, Nov. 12-16, 2012, R1-124997.

Research In Motion, UK Limited: "Half duplex operation in TDD inter-band CA with different UL/DL configurations," 3GPP TSG RAN WG1 Meeting #71, Nov. 12-16, 2012, R1-125070.

\* cited by examiner (a) control-plane protocol stack (b) user-plane protocol stack

SIGNAL TRANSMISSION AND RECEPTION METHOD IN WIRELESS COMMUNICATION SYSTEM SUPPORTING CARRIER AGGREGATION, AND DEVICE FOR SAME

This application is a 35 USC § 371 National Stage entry of International Application No. PCT/KR2015/009182 filed on Sep. 1, 2015, and claims priority to U.S. Provisional Application No. 62/044,408 filed Sep. 1, 2014, all of which are hereby incorporated by reference in their entireties as if fully set forth herein.

TECHNICAL FIELD

The present invention relates to a wireless communication system and, more specifically, to a signal transmission and reception method in a wireless communication system supporting carrier aggregation, and a device for the same.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a signal transmission and reception method in a wireless communication system supporting carrier aggregation, and a device for the same.

The technical problems solved by the present invention are not limited to the above technical problems and those skilled in the art may understand other technical problems from the following description.

Technical Solution

In an aspect of the present invention, a signal transmission and reception method of a UE using multiple cells in a wireless communication system supporting carrier aggregation includes: receiving transmission control information for a primary cell (PCell) and a secondary cell (SCell) conforming to different uplink-downlink configurations; transmitting and receiving signals in a specific time period according to the transmission control information; and performing signal transmission and reception operations according to a predefined configuration when the transmission control information does not indicate signal transmission in the specific time period.

A downlink signal reception operation may be performed using the secondary cell in the specific time period when the primary cell corresponds to an uplink subframe and the secondary cell corresponds to a downlink subframe in the specific time period. The signal transmission and reception method may further include feeding back HARQ-ACK information according to the downlink signal reception operation using a self-scheduling related downlink HARQ timeline. The self-scheduling related downlink HARQ timeline may be a downlink HARQ timeline related to an uplink-downlink configuration defined to include both a downlink subframe set of the primary cell and a downlink subframe set of the secondary cell.

A downlink signal reception operation may be performed using the secondary cell in at least part of the specific time period when the primary cell corresponds to a special subframe and the secondary cell corresponds to a downlink subframe in the specific time period. The at least part of the specific time period may include a time period corresponding to an UpPTS in the specific frame of the primary cell.

An operation of transmitting a predefined uplink signal using the secondary cell in the specific time period may be performed when the primary cell corresponds to a downlink subframe and the secondary cell corresponds to an uplink subframe in the specific time period. The operation of transmitting a predefined uplink signal is performed when triggering information for uplink signal transmission in the uplink subframe of the secondary cell is received.

A downlink signal reception operation may be performed using the secondary cell in at least part of the specific time period when the primary cell corresponds to a downlink subframe and the secondary cell corresponds to a special subframe in the specific time period.

The signal transmission and reception method may further include receiving information indicating uplink signal/uplink channel scheduling associated with a specific uplink subframe.

In another aspect of the present invention, a UE performing signal transmission and reception using multiple cells in a wireless communication system supporting carrier aggregation includes: a radio frequency unit; and a processor, wherein the processor is configured to receive transmission control information for a primary cell (PCell) and a secondary cell (SCell) conforming to different uplink-downlink configurations and to transmit and receive signals in a specific time period according to the transmission control information, and wherein the processor is configured to perform signal transmission and reception operations according to a predefined configuration when the transmission control information does not indicate signal transmission in the specific time period.

Advantageous Effects

According to embodiments of the present invention, it is possible to efficiently perform signal transmission and reception in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Additionally, the specific terms used in the following description of the present invention are provided to facilitate the understanding of the present invention. And, therefore, without deviating from the technical scope and spirit of the present invention, such specific terms may also be varied and/or replaced by other terms.

Figure 1:
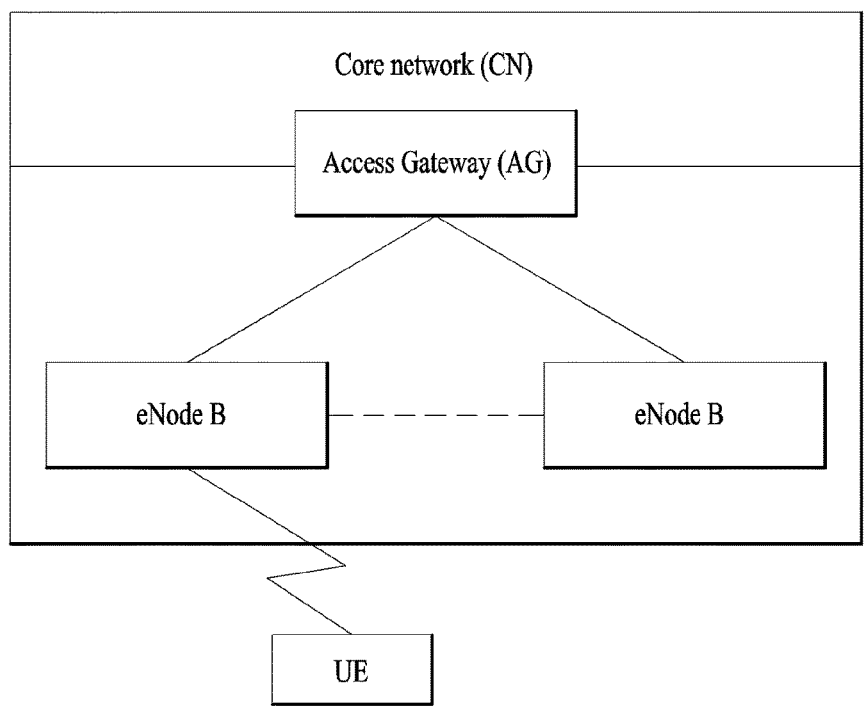
FIG. 1 is a diagram showing a network structure of an Evolved Universal Mobile Telecommunications System (E-UMTS) as an example of a wireless communication system.
Figure 2:
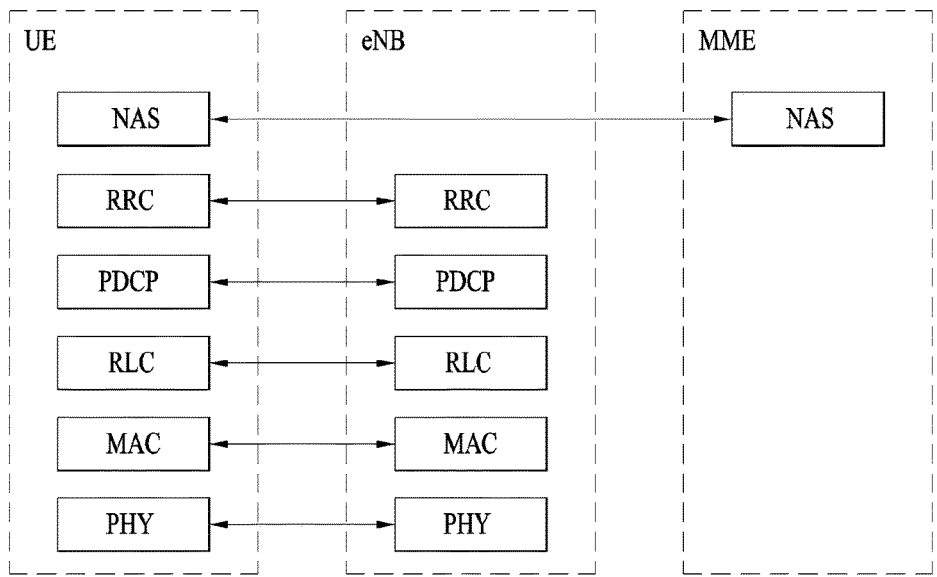
FIG. 2 is a diagram showing a control plane and a user plane of a radio interface protocol between a UE and an E-UTRAN based on a 3rd generation partnership project (3GPP) radio access network standard.
Figure 2:
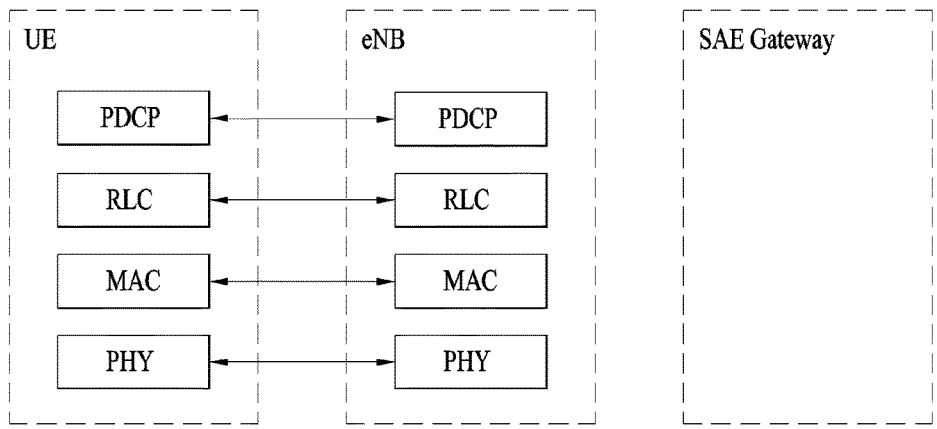

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
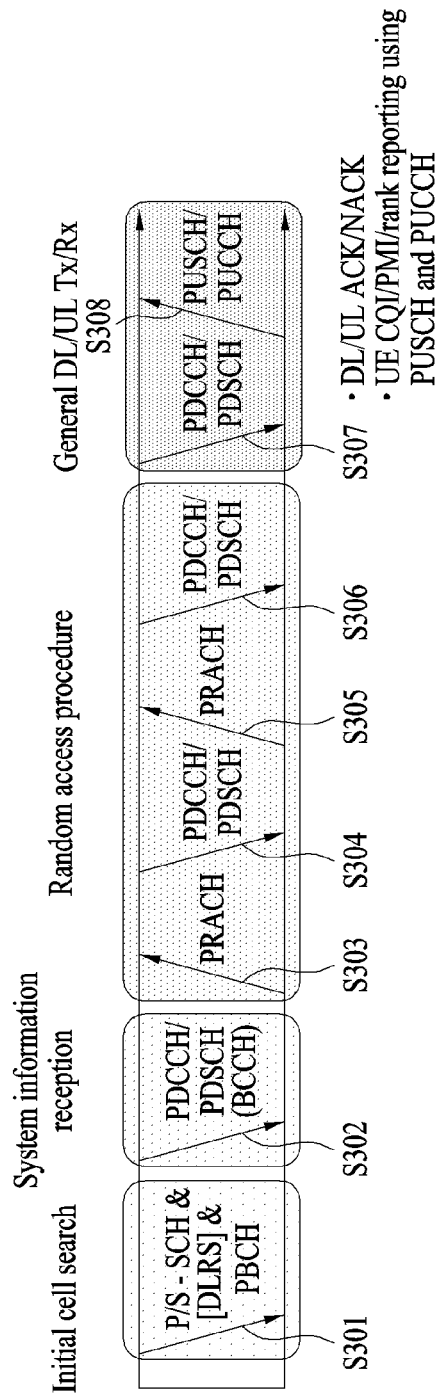
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303) and receive a response message of the preamble through the PDCCH and the PDSCH corresponding thereto (S304). In the contention-based RACH a contention resolution procedure, such as a transmission of the PRACH (S305) and a reception of the PDCCH and the PDSCH corresponding thereto (S306), may be additionally performed.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 4:
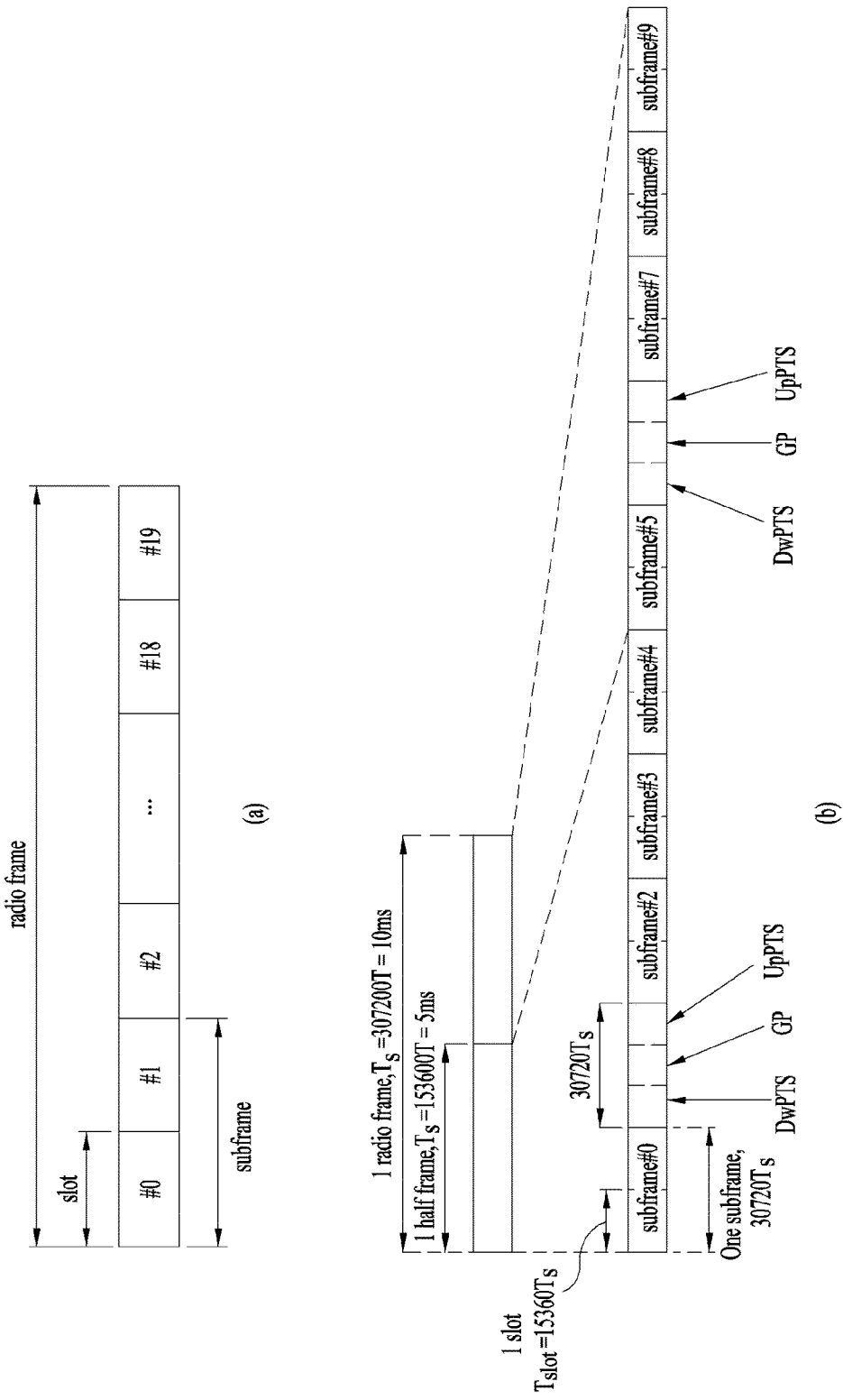
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 4(b) illustrates the type-2 radio frame structure. The type-2 radio frame includes two half frames each having 4 normal subframes, a downlink pilot time slot (DwPTS), a guard period (GP), and an uplink pilot time slot (UpPTS). Each normal subframe includes two slots.

In the special subframe, the DwPTS is used for initial cell search, synchronization, or channel estimation in a UE, whereas the UpPTS is used for channel estimation in an eNB and uplink transmission synchronization in a UE. That is, the DwPTS is used for a downlink transmission, the UpPTS is used for a uplink transmission, and, specifically, the UpPTS is used for a transmission of the PRACH preamble or a SRS. The GP is a period between a downlink and an uplink, for eliminating interference with the uplink caused by multi-path delay of a downlink signal.

In the current 3GPP standard document, the configuration of a special subframe is defined as shown below in Table 1. In Table 1, when $T_s=1/(15000\times2048)$, this indicates DwPTS and UpPTS, and the remaining area is set up as the guard period.

included in the radio frame or the number of slots included in a subframe, and the number of symbols included in one slot may be diversely varied.

Figure 5:
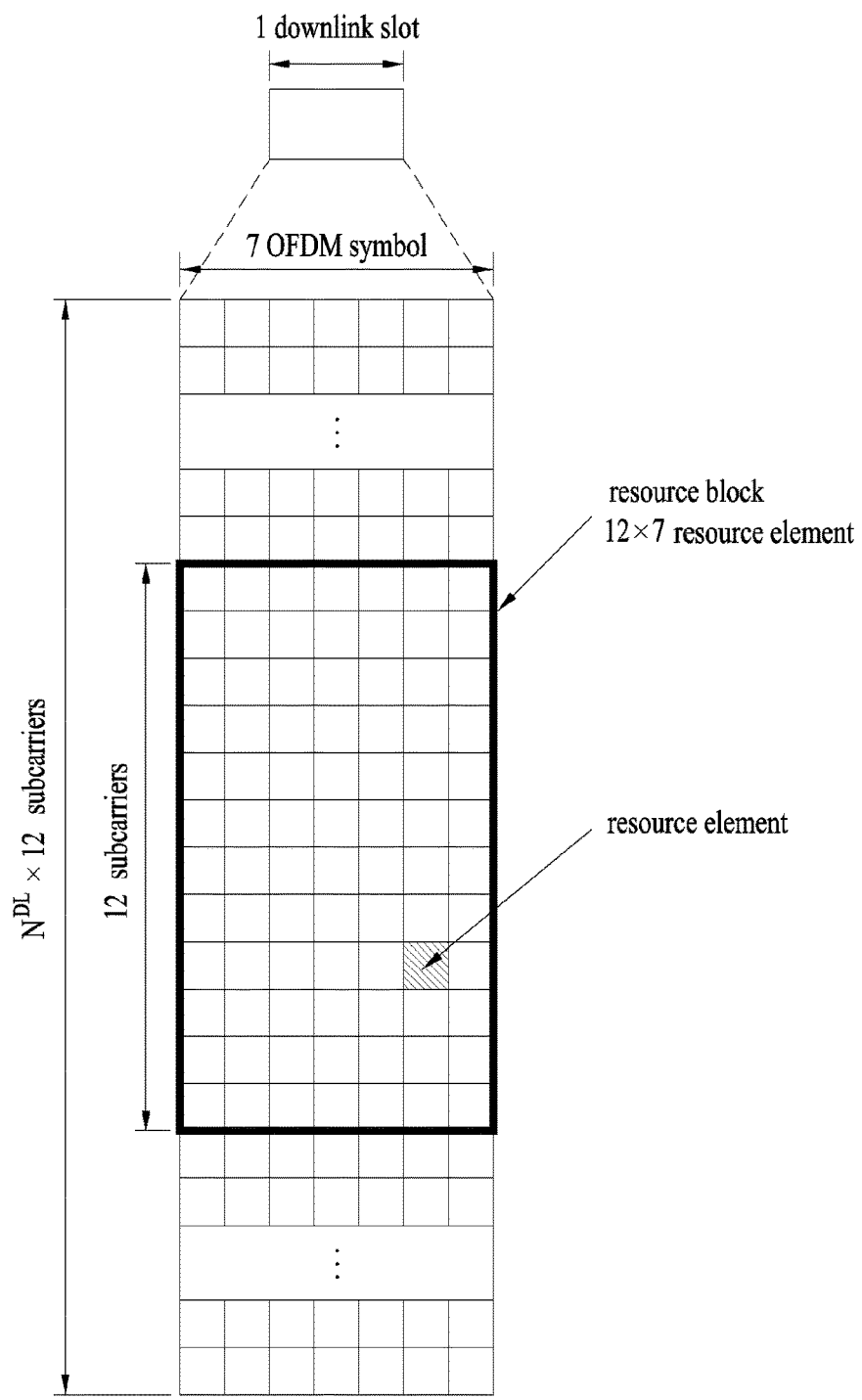
FIG. 5 illustrates a resource grid for a downlink slot.

FIG. 5 illustrates a resource grid for a downlink slot.

Referring to FIG. 5, a downlink slot includes $Na_{symb}^{DL}$ OFDM symbols in a time domain and $N_{RB}^{DL}$ resource blocks in a frequency domain. Since each resource block includes $N_{SC}^{RB}$ subcarriers, the downlink slot includes $N_{RB}^{DL} \times N_{SC}^{RB}$ subcarriers in the frequency domain. Although FIG. 5 illustrates that the downlink slot includes 7 OFDM symbols and the resource block includes 12 subcarriers, it is to be understood that the present invention is not limited thereto. For example, the number of OFDM symbols included in the downlink slot may be changed depending on a length of CP (cyclic prefix).

Each element on a resource grid is referred to as a resource element (RE). One resource element is indicated by one OFDM symbol index and one subcarrier index. One RB includes $N_{symb}^{DL} \times N_{SC}^{RB}$ resource elements. The number

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, in a Type 2 radio frame structure, more specifically, in a TDD system, an uplink/downlink subframe configuration (UL/DL configuration) is as shown below in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe, and S represents the special subframe. Additionally, in Table 2, downlink-uplink switching periodicity in the uplink/downlink subframe configuration of each system.

The above-described structure of the radio frame is merely exemplary. And, therefore, the number of subframes $N_{RB}^{DL}$ of resource blocks included in the downlink slot depends on a downlink transmission bandwidth configured in a cell.

Figure 6:
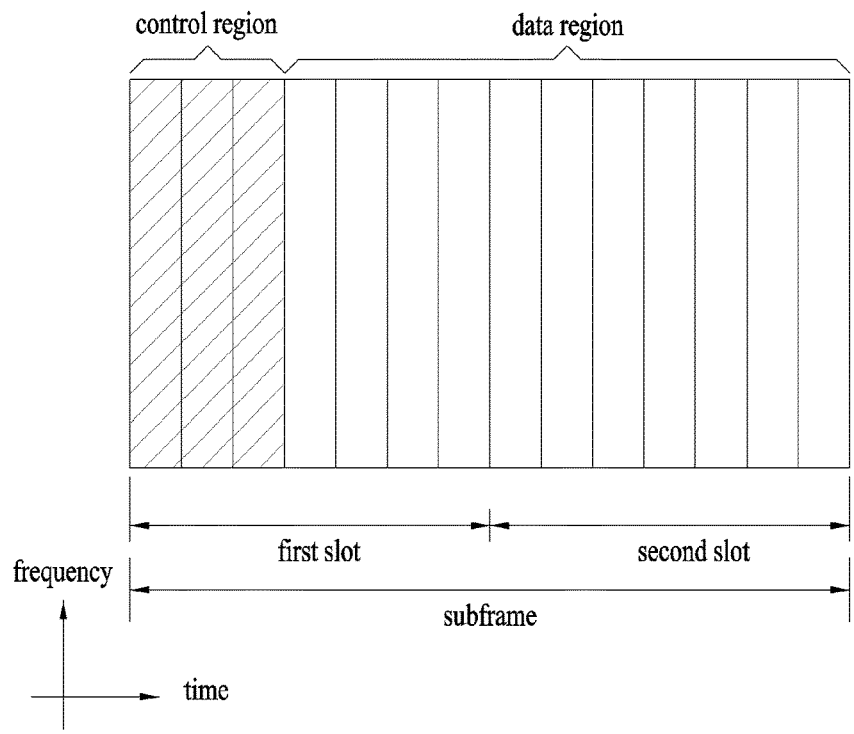
FIG. 6 illustrates an example of a downlink subframe structure.

FIG. 6 illustrates a downlink subframe structure.

Referring to FIG. 6, up to three (or four) OFDM symbols at the start of the first slot in a downlink subframe are used for a control region to which control channels are allocated and the other OFDM symbols of the downlink subframe are used for a data region to which a PDSCH is allocated. Downlink control channels used in LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission.

Control information carried on the PDCCH is called downlink control information (DCI). The DCI includes uplink resource allocation information and other control information for an UE or an UE group. For example, the DCI includes downlink/uplink scheduling information, an uplink transmit (Tx) power control command, and etc.

The PDCCH carries transmission format and resource allocation information of a downlink shared channel (DL- SCH), transmission format and resource allocation information of an uplink shared channel (UL-SCH), paging information on a paging channel (PCH), system information on the DL-SCH, resource allocation information of an upper layer control message such as a random access response transmitted on the PDSCH, a set of Tx power control commands for individual UEs in a UE group, Tx power control command, activity indication information of voice over Internet protocol (VoIP), and the like. A plurality of PDCCHs can be transmitted in the control region. The UE is able to monitor a plurality of the PDCCHs. The PDCCH is transmitted on aggregation of one or a plurality of consecutive control channel elements (CCEs). The CCE is a logic allocation unit used to provide the PDCCH with a coding rate based on a radio channel state. The CCE corresponds to a plurality of resource element groups (REGs). The format of the PDCCH and the number of bits of the PDCCH are determined according to the number of CCEs. An eNB determines the PDCCH format according to the DCI to be transmitted to a UE and attaches cyclic redundancy check (CRC) to the control information. The CRC is masked with an identifier (e.g., radio network temporary identifier (RNTI)) depending on usage of the PDCCH or an owner of the PDCCH. For instance, if the PDCCH is for a specific UE, the CRC may be masked with an identifier (e.g., cell-RNTI (C-RNTI)) of the corresponding UE. If the PDCCH is for a paging message, the CRC may be masked with a paging identifier (e.g., paging-RNTI (P-RNTI)). If the PDCCH is for system information (more particularly, system information block (SIB)), the CRC may be masked with a system information RNTI (SI-RNTI). If the PDCCH is for a random access response, the CRC may be masked with a random access RNTI (RA-RNTI).

Figure 7:
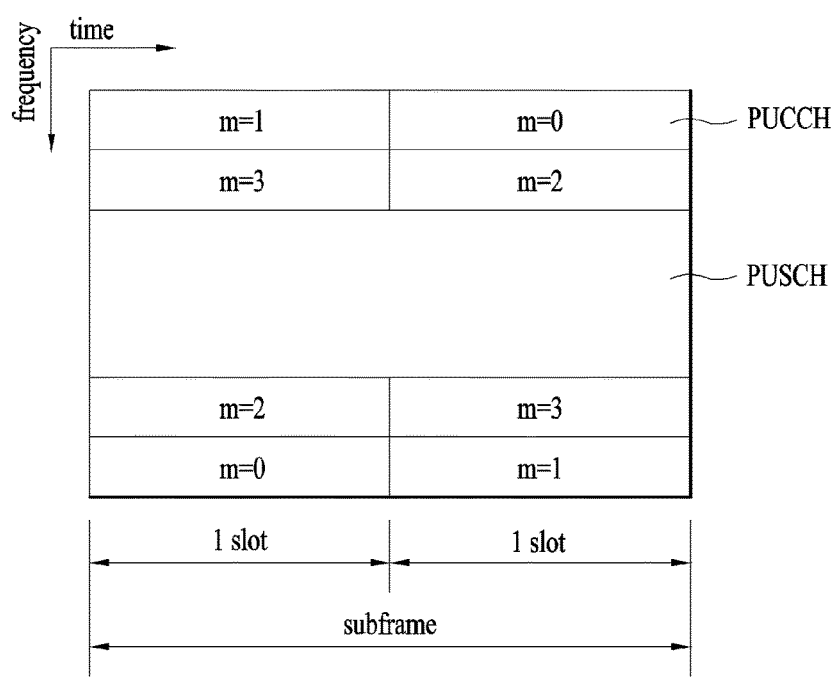
FIG. 7 is a diagram showing a structure of an uplink subframe used in LTE.

FIG. 7 illustrates a structure of an uplink subframe used in LTE.

Referring to FIG. 7, an uplink subframe includes a plurality (e.g., 2) of slots. The number of SC-FDMA symbols included in the slot may vary depending on the CP length. The uplink subframe is divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH can be used to transmit the following control information.

SR (scheduling request): Information used to request UL-SCH resources. This is transmitted using an on-off keying (OOK) scheme.

HARQ ACK/NACK: Response signal with respect to a downlink data packet on PDSCH. This indicates whether the downlink data packet is successfully received. 1-bit ACK/NACK is transmitted in response to a single downlink codeword and 2-bit ACK/NACK is transmitted in response to two downlink codewords.

CSI (channel state information): Feedback information with respect to a downlink channel. The CSI includes a channel quality indicator (CQI) and MIMO-related (multiple input multiple output) feedback information includes a rank indicator (RI), a precoding matrix indicator (PMI) and a precoding type indicator (PTI). 20 bits are used in each subframe.

The amount of UCI that can be transmitted in a subframe by a UE depends on the number of SC-FDMA symbols available for control information transmission. The SC-FDMA symbols available for control information transmission mean the remaining SC-FDMA symbols except SC-FDMA symbols for reference signal transmission in a subframe. In case of a subframe having a sounding reference signal (SRS) configured therein, a last SC-FDMA symbol of the subframe is also excluded. The reference signal is used for coherent detection of the PUCCH.

Figure 8:
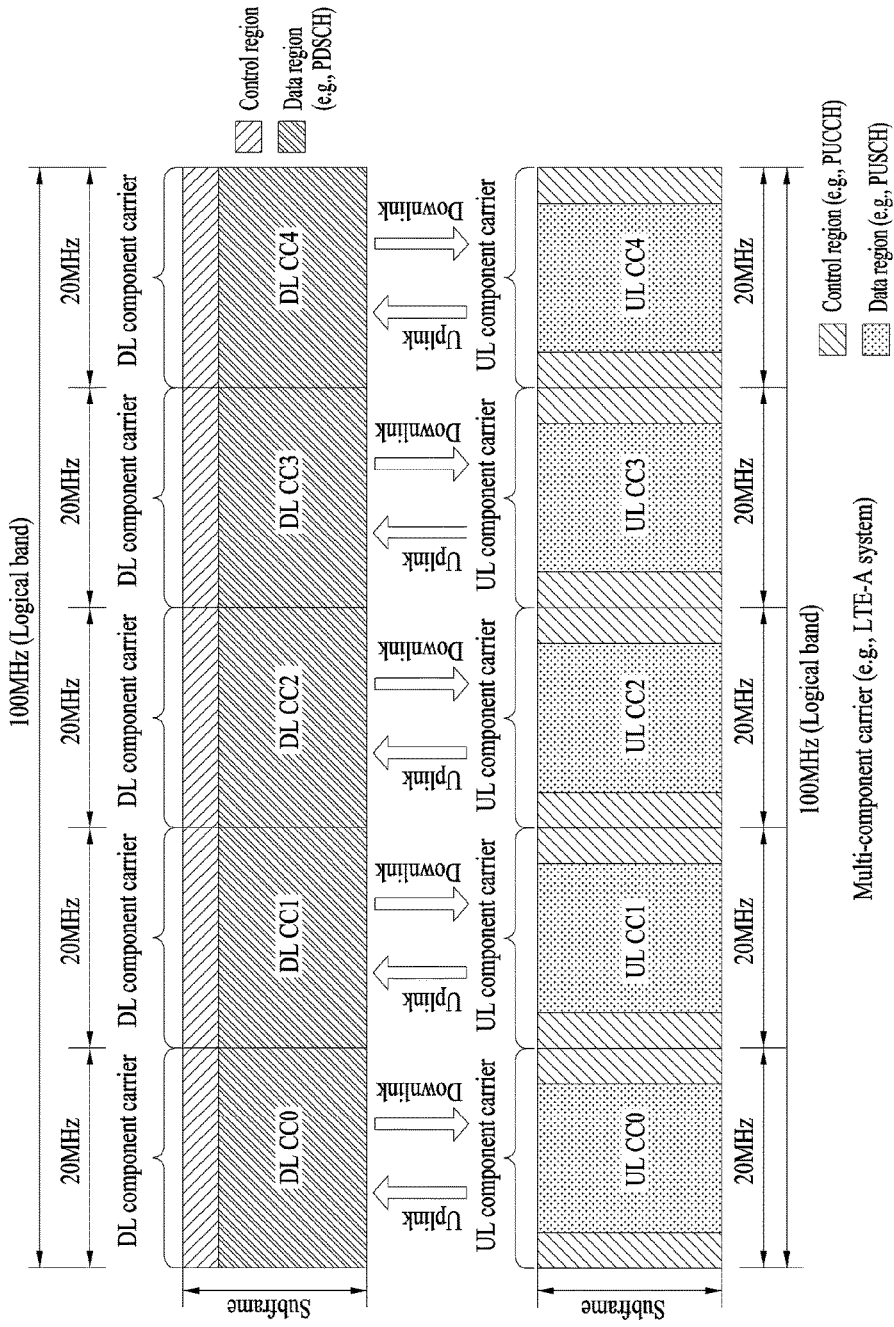
FIGS. 8 and 9 are reference diagrams illustrating carrier aggregation.

FIG. 8 illustrates a carrier aggregation (CA) communication system.

Referring to FIG. 8, a communication system may support wider uplink/downlink bandwidths by aggregating a plurality of uplink/downlink component carriers (CCs). The term "component carrier (CC)" may be replaced by other equivalent terms (e.g., carrier, cell and the like). CCs may be contiguous or non-continuous in the frequency domain. Bandwidths of CCs may be independently set. Asymmetrical carrier aggregation in which the number of UL CCs differs from the number of DL CCs may be possible. Control information may be configured to be transmitted and received only through a specific CC. Such specific CC may be referred to as a primary CC (or anchor CC) and other CCs may be referred to as secondary CCs.

When cross-carrier scheduling (or cross-CC scheduling) is applied, a PDCCH for downlink assignment may be transmitted on DL CC#0 and a PDSCH corresponding thereto may be transmitted on DL CC#2. For cross-CC scheduling, introduction of a carrier indicator field (CIF) may be considered. Presence or absence of the CIF in a PDCCH may be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.
No CIF
The same as an LTE PDCCH structure (resource mapping based on the same coding and same CCE) and DCI format
CIF enabled: a PDCCH on a DL CC may be used to allocate a PDSCH or PUSCH resource on a specific DL/UL CC from among a plurality of aggregated DL/UL CCs using the CIF.
LTE DCI format extended to have the CIF
CIF corresponds to a fixed x-bit field (e.g. x=3) (when the CIF is set).
CIF position is fixed irrespective of DCI format size (when the CIF is set).
LTE PDCCH structure is reused (resource mapping based on the same coding and same CCE)

When the CIF is present, a BS may allocate a PDCCH monitoring DL CC set to reduce BD complexity of a UE. The PDCCH monitoring DL CC set includes one or more DL CCs as part of aggregated DL CCs, and the UE performs detection/decoding only on corresponding DL CCs. That is, when the BS schedules a PDSCH/PUSCH for the UE, the PDCCH is transmitted only through the PDCCH monitoring DL CC set. The PDCCH monitoring DL CC set may be set UE-specifically, UE-group-specifically or cell-specifically. The term "PDCCH monitoring DL CC" may be replaced by equivalent terms such as a monitoring carrier and a monitoring cell. Further, CCs aggregated for a UE may be replaced by equivalent terms such as serving CCs, serving carriers and serving cells.

Figure 9:
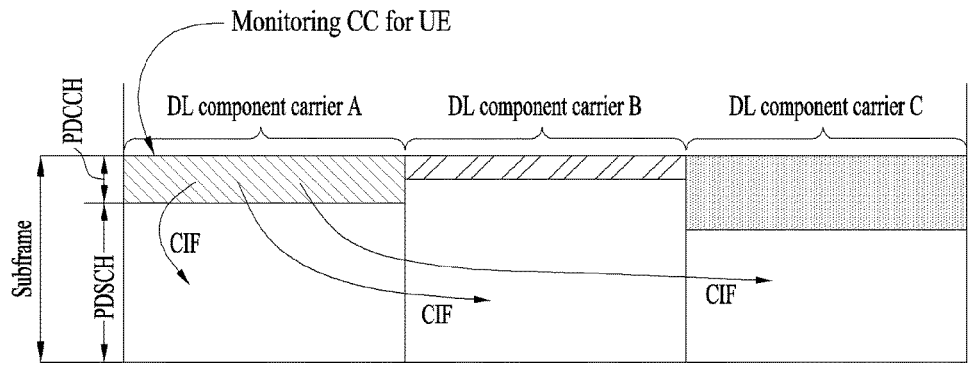

FIG. 9 illustrates scheduling when a plurality of carriers is aggregated. It is assumed that three DL CCs are aggregated. In addition, it is assumed that DL CC A is set to a PDCCH monitoring DL CC. DL CC A, DL CC B and DL CC C may be called serving CCs, serving carriers, serving cells, etc. In case of CIF disabled, a DL CC can carry only a PDCCH that schedules a PDSCH corresponding to the DL CC without a CIF according to LTE PDCCH configuration. When the CIF is enabled according to UE-specific (or UE-group-specific or cell-specific) higher layer signaling, DL CC A (monitoring DL CC) may carry not only a PDCCH that schedules the PDSCH corresponding to DL CC A but also PDCCHs that schedule PDSCHs of other DL CCs using the CIF. In this case, a PDCCH is not transmitted on DL CC B/DL CC C, which are not set to PDCCH monitoring DL CCs. Accordingly, DL CC A (monitoring DL CC) needs to include all of a PDCCH search region associated with DL CC A, a PDCCH search region associated with DL CC B and a PDCCH search space associated with DL CC C. In the specification, it is assumed that a PDCCH search region is defined per carrier.

As described above, LTE-A considers use of the CIF in a PDCCH for cross-CC scheduling. Whether the CIF is used (that is, whether the cross-CC scheduling mode or non-cross-CC scheduling mode is supported) and switching between modes may be semi-statically/UE-specifically set through RRC signaling. The UE may recognize whether the CIF is used in a PDCCH that will be scheduled for the UE after passing through RRC signaling.

A description will be given of a method of efficiently using radio resources on a specific cell when interference due to different communication directions exists between cells (or component carriers) to which carrier aggregation (CA) has been applied according to the present invention.

The present invention will be described on the basis of 3GPP LTE for convenience of description. However, the range of systems to which the present invention is applicable can be extended to other systems in addition to 3GPP LTE.

For convenience of description of the present invention, a situation in which INTRA-BAND CA (referred to hereinafter as "INTRA_BD_CA") is applied and different UL-DL configurations are set to corresponding cells (referred to hereinafter as "INTRA_BD_CA W/DIFF_CONFIG") is assumed. For reference, embodiments of the present invention can be extended and applied to any situation in which interference due to different communication directions is present or generated between cells to which CA has been applied as well as the aforementioned case (i.e., "INTRA_BD_CA W/DIFF_CONFIG").

In addition, embodiments of the present invention are applicable to UEs that cannot perform simultaneous transmission and reception at a specific time on cells to which CA has been applied (e.g., INTER-BAND CA (referred to as "INTER_BD_CA")) or UEs that may perform simultaneous transmission and reception at a specific time on cells to which CA has been applied (i.e., INTER_BD_CA) but cannot actually perform simultaneous transmission and reception due to self-interference caused by INTRA_BD_CA.

Furthermore, uplink/downlink communication may be set to be performed (re)using the following tables 3 and 4 in an "INTRA_BD_CA W/DIFF_CONFIG" environment. This may be interpreted as assumption that a UE cannot perform simultaneous transmission and reception at a specific time on cells to which CA has been applied in an INTRA_BD_CA W/DIFF_CONFIG environment irrespective of whether the UE can perform simultaneous transmission and reception at a specific time on cells to which CA has been applied (e.g., INTER_BD_CA).

According to the following tables 3 and 4, it can be determined that actual communication is not performed or actual execution of communication is not expected on resources of an SCell that do not correspond to usage of resources of a PCell (i.e., priority is assigned to usage and use of resources of the PCell). When this is applied in an INTRA_BD_CA W/DIFF_CONFIG environment, interference due to different communication directions of the PCell and the SCell can be avoided. However, when the regulations of Tables 3 and 4 are (re)used in an INTRA_BD_CA W/DIFF_CONFIG environment, (downlink/uplink) resources of the SCell cannot be efficiently used depending on traffic load state variation because usage and use of resources of the PCell are given priority.

Tables 3 and 4 show regulations/settings regarding communication operations of UEs that cannot perform simultaneous transmission and reception at a specific time on cells to which CA has been applied. Refer to LTE/LTE-A related 3GPP TS 36.211 Section 4.2 "Frame structure type 2" for details of Table 3 and refer to 3GPP TS 36.213 Section 7.2.3 "Channel Quality Indicator (CQI) definition" for details of Table 4.

TABLE 3

In case multiple cells with different uplink-downlink configurations in the current radio frame are aggregated and the UE is not capable of simultaneous reception and transmission in the aggregated cells, the following constraints apply:
if the subframe in the primary cell is a downlink subframe, the UE shall not transmit any signal or channel on a secondary cell in the same subframe
if the subframe in the primary cell is an uplink subframe, the UE is not expected to receive any downlink transmissions on a secondary cell in the same subframe
if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

TABLE 4

A downlink subframe in a serving cell shall be considered to be valid if:
it is configured as a downlink subframe for that UE, and
in case multiple cells with different, uplink-downlink configurations are aggregated and the UE is not capable of simultaneous reception and transmission in the aggregated cells, the subframe in the primary cell is a downlink subframe or a special subframe with the length of DwPTS more than $7680 \cdot T_s$, and
except for transmission mode 9 or 10, it is not an MBSFN subframe, and
it does not contain a DwPTS field in case the length of DwPTS is $7680 \cdot T_s$ and less, and TABLE 4-continued it does not fall within a configured measurement gap for that UE, and
for periodic CSI reporting, it is an element of the CSI subframe set linked to the periodic CSI
report when that UE is configured with CSI subframe sets, and
for a UE configured in transmission mode 10 with multiple configured CSI processes, and
aperiodic CSI reporting for a CSI process, it is an element of the CSI subframe set linked to
the downlink subframe with the corresponding CSI request in an uplink DCI format, when
that UE is configured with CSI subframe sets for the CSI process.

Based on the above description, a method of efficiently using radio resources on a specific cell when interference due to different communication directions is present between cells (or component carriers) to which CA has been applied (e.g., INTRA_BD_CA W/DIFF_CONFIG) in the present invention will be described. For example, it is possible to solve problems caused by application of Table 3 or 4 (e.g., a problem that resources of an SCell cannot be efficiently used depending on traffic load state variation) by applying one or all embodiments of the present invention.

Figure 10:
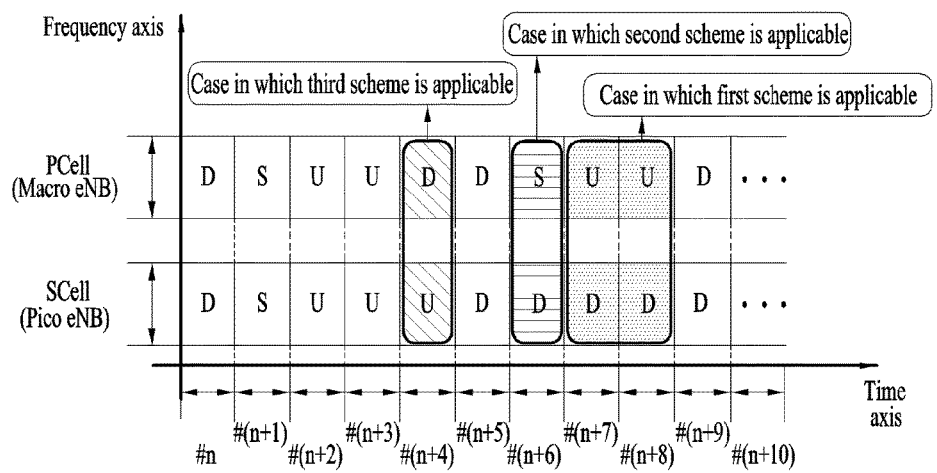
FIGS. 10 and 11 are reference diagrams illustrating scenarios to which methods proposed by the present invention are applied.

FIG. 10 illustrates a case to which embodiments (e.g., first to third methods) of the present invention are applicable. Here, it is assumed that a PCell (e.g., macro eNB) is set to uplink-downlink configuration #1 and an SCell (e.g., pico eNB) is set to uplink-downlink configuration #3. In addition, FIG. 10 assumes that the macro eNB (i.e., PCell) and the pico eNB (i.e., SCell) connected through ideal backhaul (or non-ideal backhaul) are set to CA or dual connectivity (e.g., INTRA_BD_CA W/DIFF_CONFIG).

First Scheme

The present invention is described with reference to FIG. 10. When the PCell (e.g., Cell#A) corresponds to a UL SF and the SCell (e.g., Cell#B) corresponds to a DL SF at a specific time SF#N (e.g., SF#(n+7) and SF#(n+8)), if (predefined) uplink signal transmission (e.g., transmission of a PUSCH, a PUCCH (A/N, CSI), an SR, an SRS, etc.) is not set/indicated on the PCell UL SF, a UE can be set to perform (E)PDCCH blind decoding (and/or PDSCH reception) in the SCell DL SF at the same time (i.e., SF#(n+7) and SF#(n+8)). This scheme may be interpreted as change of the PCell from Cell#A to Cell#B or change of the SCell from Cell#B to Cell#A in SF#N.

As another example, information about positions of PCell UL SFs (or SCell DL SFs) to which the first scheme is applied may be delivered to the UE through predefined signaling (e.g., physical layer signaling or higher layer signaling).

By delivering information about positions of PCell UL SFs (or SCell DL SFs) to which the first scheme is applied to limit the positions of the PCell UL SFs (or SCell DL SFs), it is possible to solve a discordance problem with respect to supposition of resources (e.g., PCell UL SFs or SCell DL SFs) in which actual communication is performed between the BS and the UE, which is generated when the UE cannot successfully receive control information related to (predefined) uplink signal transmission (e.g., transmission of a PUSCH, A-CSI, A-SRS, etc.) in PCell UL SFs.

Second Scheme

The present invention is described with reference to FIG. 10. When the PCell (e.g., Cell#A) corresponds to a special SF and the SCell (e.g., Cell#B) corresponds to a DL SF at a specific time SF#N (e.g., SF #(n+6)), if (predefined) uplink signal transmission (e.g., transmission of an SRS, etc.) is not set/indicated on the PCell UpPTS, a UE can be set to perform (E)PDCCH blind decoding (and/or PDSCH reception) in at least part (i.e., all or part) of the SCell DL SF at the same time (i.e., SF#(n+6)).

Here, the part of the SCell DL SF may be defined such that (E)PDCCH/PDSCH reception can be performed only in an SCell DwPTS on the assumption that an SCell DL SF corresponding to a PCell DwPTS, that is, the SCell DL SF, is a special SF having the same configuration as the PCell. Otherwise, the part of the SCell DL SF may be defined such that (E)PDCCH/PDSCH reception can be performed only in an SCell DwPTS/GP on the assumption that an SCell DL SF corresponding to a PCell DwPTS/GP, that is, the SCell DL SF, is a special SF having the same configuration as the PCell. Further, this scheme may be interpreted as change of the PCell from Cell#A to Cell#B (or change of the SCell from Cell#B to Cell#A) in SF#N in the present invention.

As another example, information about positions of PCell special SFs (or SCell DL SFs) to which the second scheme is applied may be delivered to the UE through predefined signaling (e.g., physical layer signaling or higher layer signaling). By delivering information about positions of PCell special SFs (or SCell DL SFs) to which the second scheme is applied to limit the positions of the PCell special SFs (or SCell DL SFs), it is possible to solve a discordance problem with respect to supposition of resources (e.g., PCell special SFs or SCell DL SFs) in which actual communication is performed between the BS and the UE, which is generated when the UE cannot not successfully receive control information related to (predefined) uplink signal transmission (e.g., transmission of an A-SRS and the like) in a PCell UpPTS.

Third Scheme

The present invention is described with reference to FIG. 10. When the PCell (i.e., Cell#A) corresponds to a DL SF and the SCell (i.e., Cell#B) corresponds to a UL SF at a specific time SF#N (e.g., SF#(n+4)), a UE can be set to use the SCell UL SF for (predefined) uplink signal transmission (e.g., transmission of a PUSCH, SRS and the like) by receiving a predefined indicator or employing predefined regulations.

Here, the indicator may be defined as UL grant information that triggers or schedules (predefined) uplink signal transmission in the SCell UL SF, an indicator (e.g., a physical layer indicator (PDCCH) or a higher layer indicator (RRC)) newly defined for the corresponding purpose, or the like.

When UL grant information related to PUSCH transmission on SCell UL SF#N is received as an example of the UL grant information that triggers or schedules uplink signal transmission in SF#(N−4) (e.g., SF#(n) in FIG. 10) of the SCell (i.e., a self-scheduling case) or DL SF#(N−4) (e.g., SF#(n) in FIG. 10) of the PCell (i.e., a cross-scheduling case) according to an SCell UL HARQ timeline, the UE performs PUSCH transmission in SCell UL SF#N but does not perform (E)PDCCH/PDSCH reception in PCell DL SF#N. This scheme may be interpreted as change of the PCell from Cell#A to Cell#B (or change of the SCell from Cell#B to Cell#A) in SF#N.

Further, information about positions of PCell DL SFs (or SCell UL SFs) to which the third scheme is applied may be delivered to the UE through predefined signaling (e.g., physical layer signaling or higher layer signaling). Here, by delivering information about positions of PCell DL SFs (or SCell UL SFs) to which the third scheme is applied to limit the positions of the PCell DL SFs (or SCell UL SFs), it is possible to solve a discordance problem with respect to supposition of resources (e.g., PCell DL SFs or SCell UL SFs) in which actual communication is performed between the BS and the UE, which is generated when the UE cannot not successfully receive control information related to (predefined) uplink signal transmission (e.g., transmission of a PUSCH, A-CSI, A-SRS, etc.) on SCell UL SFs.

Fourth Scheme

Figure 11:
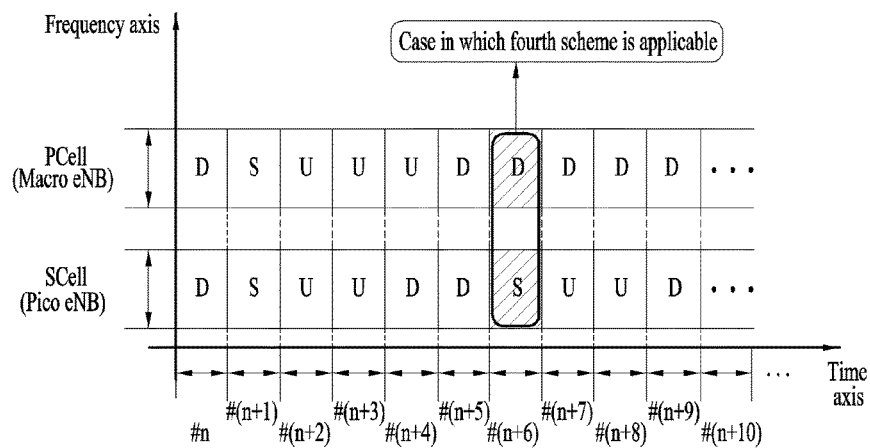

FIG. 11 is a reference diagram illustrating a case to which the fourth scheme of the present invention is applicable. In FIG. 11, it is assumed that a PCell is set to uplink-downlink configuration #3 (i.e., "DSUUUDDDDD") and an SCell is set to uplink-downlink configuration #1 (i.e., "DSUUDDSUUD"). In addition, FIG. 11 assumes that the macro eNB (i.e., PCell) and the pico eNB (i.e., SCell) connected through ideal backhaul (or non-ideal backhaul) are set to CA or dual connectivity (e.g., INTRA_BD_CA W/DIFF_CONFIG).

The present invention is described with reference to FIG. 11. When the PCell (i.e., Cell#A) corresponds to a DL SF and the SCell (i.e., Cell#B) corresponds to a special SF at a specific time SF#N (e.g., SF#(N+6)), a UE can be set to perform (E)PDCCH blind decoding (and/or PDSCH reception) in at least part (i.e., all or part) of the SCell special SF region according to predefined regulations.

Here, the part of the SCell special SF region may be defined as an SCell DwPTS/GP region (or SCell DwPTS). Otherwise, the whole SCell special SF region may be regarded as an SCell DL SF (i.e., (E)PDCCH blind decoding (and/or PDSCH reception) in a DL SF is performed).

Further, information about positions of PCell DL SFs (or SCell special SFs) to which the fourth scheme is applied may be delivered to the UE through predefined signaling (e.g., physical layer signaling or higher layer signaling).

Fifth Scheme.

The present invention is described with reference to FIG. 10. When the first scheme is applied at a time SF#N (e.g., SF#(n+7) and SF#(n+8)) at which the PCell (i.e., Cell#A) corresponds to a UL SF and the SCell (i.e., Cell#B) corresponds to a DL SF, transmission of HARQ-ACK information related to SCell (i.e., Cell#B) DL SF#N in which (E)PDCCH blind decoding (and/or PDSCH reception) is performed may be defined such that the HARQ-ACK information is transmitted according to a self-scheduling related DL HARQ timeline, that is, an uplink-downlink configuration related DL HARQ timeline including the DL SF union of the PCell and the SCell irrespective of whether cross-scheduling is set.

It is possible to solve a problem that an SCell (i.e., Cell#B) DL SF#N related DL HARQ timeline is not defined when cross-scheduling is set (i.e., the SCell conforms to an uplink-downlink configuration related DL HARQ timeline of the PCell) by employing the fifth scheme. In addition, when the fifth scheme is applied, a previously defined or signaled PUCCH format (e.g., PUCCH format 3) may be (exceptionally) used.

Sixth Scheme

According to the present invention, when cell #A (PCell) and cell #B (SCell) are set for a specific UE through dual connectivity (e.g., INTRA_BD_CA W/DIFF_CONFIG), the cells may be set to exchange i) information representing that (dynamic or semi-static) uplink signal/channel scheduling associated with a specific UL SF will not be performed or ii) information representing that (dynamic or semi-static) uplink signal/channel scheduling associated with a specific UL SF will be performed through a predefined channel (e.g., X2 interface or radio channel).

Here, the information may be defined in the form of UE-specific information. That is, even though Cell#A (e.g., a macro eNB or a PCell (master cell group, MCG)) does not perform (dynamic or semi-static) uplink signal/channel scheduling for a specific UE in a specific UL SF#K, Cell#A may perform (dynamic or semi-static) uplink signal/channel scheduling for other UEs in the UL SF#K to thereby improve radio resource utilization.

Alternatively, the UE-specific information may be realized in such a manner that priority of (dynamic or semi-static) uplink signal/channel scheduling for a specific UE is assigned to all UL SFs. For example, the UE-specific information can be configured to indicate the order of UL SFs from a UL SF in which (dynamic or semi-static) uplink signal/channel scheduling will be performed with highest probability to a UL SF in which (dynamic or semi-static) uplink signal/channel scheduling will be performed with lowest probability for the specific UE.

Alternatively, the present scheme may be applied only when Cell #A (e.g., a macro eNB or a PCell (MCG) and Cell#B (e.g., pico eNB or an SCell (secondary cell group (SCG)) are established/connected through dual connectivity (e.g., INTRA_BD_CA W/DIFF_CONFIG).

In addition, Cell#B (e.g., a pico eNB or an SCell (SCG)) that has received the corresponding information from Cell#A (e.g., a macro eNB or a PCell (MCG)) may signal related information to the specific UE such that the first scheme is limitedly applied in at least part (i.e., all or part) of UL SFs in which Cell#A will not perform (dynamic or semi-static) uplink signal/channel scheduling and which correspond to (all or part of) DL SFs in the uplink-downlink configuration of Cell#B. Here, since (dynamic or semi-static) uplink signal/channel scheduling is not performed in the corresponding UL SFs (i.e., DL SFs in the uplink-downlink configuration of Cell#B (a pico eNB or an SCell (SCG)) of Cell#A (i.e., a macro eNB or a PCell (MCG)), the specific UE performs (E)PDCCH blind decoding (and/or PDSCH reception) in the DL SFs of Cell#B corresponding to the UL SFs all the time according to the first scheme.

Alternatively, upon reception of information representing that (dynamic or semi-static) uplink signal/channel scheduling associated with a specific UL SF will not be performed from Cell#A (e.g., a macro eNB or a PCell (MCS)), Cell#B (e.g., a pico eNB or an SCell (SCG)) may signal the information to the specific UE through previously defined signaling.

For example, the specific UE which has received the information may implicitly perform Cell#B related (E)PDCCH blind decoding (and/or PDSCH reception) in subframes corresponding to the UL SFs in which Cell#A (e.g., a macro eNB or a PCell (MCS)) will not perform (dynamic or semi-static) uplink signal/channel scheduling and corresponding to DL SFs in the uplink-downlink configuration of Cell#B (e.g., a pico eNB or an SCell (SCG)) according to the first scheme.

The above-described schemes/embodiments/setup/regulations of the present invention may be realized as independent embodiments or a combination of at least part thereof.

Furthermore, information about the above-described schemes/embodiments/setup/regulations of the present invention or information about whether the schemes/embodiments/setup/regulations are applied may be signaled by a BS to UEs through predefined signaling (e.g., physical layer or higher layer signaling).

Moreover, embodiments of the present invention may be extended and applied to cases in which a TDD cell and an FDD cell are used through CA. In addition, the embodiments of the present invention may be extended and applied to cases in which a guard band is set between INTRA_B-D_CA W/DIFF_CONFIG related cells.

Further, the embodiments of the present invention may be limitedly applied to a case in which UEs are in a non-DRX mode.

Additionally, the embodiments of the present invention may be extended and applied to cases in which three or more cells are used through CA.

The embodiments of the present invention may be applied only when self-scheduling or cross scheduling is set in a situation in which CA is applied.

Furthermore, the embodiments of the present invention may be independently used when the settings of Tables 3 and 4 are not applied.

Figure 12:
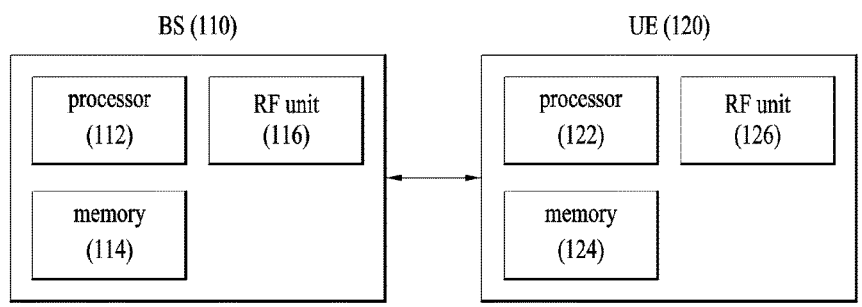
FIG. 12 illustrates a base station and a UE applicable to one embodiment of the present invention.

FIG. 12 is a diagram of a base station and a user equipment applicable to one embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this specification, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for cancelling interference in a wireless communication and the device therefor have been described based on the 3GPP LTE system, the method and device may be applied to various wireless communication systems in addition to the 3GPP LTE system.

The invention claimed is:

1. A signal transmission and reception method for a user equipment (UE) using multiple cells in a wireless communication system supporting carrier aggregation, the method comprising:
   receiving first information indicating a probability of whether an uplink is scheduled in first uplink subframes from a primary cell (PCell) and second information indicating a probability of whether an uplink is scheduled in second uplink subframes from a secondary cell (SCell);
   receiving uplink control information for the PCell and the SCell conforming to different uplink-downlink configurations;

determining whether an uplink signal is transmitted in a third uplink subframe, scheduled to transmit the uplink signal by the uplink control information based on at least one of the first information and the second information; and transmitting the uplink signal when the UE determines to transmit the uplink signal in the third uplink subframe, wherein the third uplink subframe is one of the first and the second uplink subframes.

2. The signal transmission and reception method according to claim 1, wherein a downlink signal using the SCell in a time period, when the PCell corresponds to an uplink subframe and the SCell corresponds to a downlink subframe in the time period.

3. The signal transmission and reception method according to claim 2, further comprising feeding back HARQ-ACK information according to the downlink signal reception operation using a self-scheduling related downlink HARQ timeline.

4. The signal transmission and reception method according to claim 3, wherein the self-scheduling related downlink HARQ timeline is a downlink HARQ timeline related to an uplink-downlink configuration defined to include both downlink subframes of the PCell and downlink subframes of the SCell.

5. The signal transmission and reception method according to claim 1, wherein a downlink signal reception operation is performed using the SCell in at least part of a time period when the PCell corresponds to a special subframe and the SCell corresponds to a downlink subframe in the time period.

6. The signal transmission and reception method according to claim 5, wherein the at least part of the time period includes a time period corresponding to an UpPTS in the special subframe.

7. The signal transmission and reception method according to claim 1, wherein a downlink signal reception operation is performed using the SCell in at least part of a time period when the PCell corresponds to a downlink subframe and the SCell corresponds to a special subframe in the time period.

8. A user equipment (UE) performing signal transmission and reception using multiple cells in a wireless communication system supporting carrier aggregation, the UE comprising:

a transceiver; and a processor, operatively coupled to the transceiver, that:

controls the transceiver to receive first information indicating a probability of whether an uplink is scheduled in first uplink subframes from a primary cell (PCell) and second information indicating a probability of whether an uplink is scheduled in second uplink subframes from a secondary cell (SCell), controls the transceiver to receive uplink control information for the PCell and the SCell conforming to different uplink-downlink configurations, determines whether an uplink signal is transmitted in a third uplink subframe, scheduled to transmit the uplink signal by the uplink control information based on at least one of the first information and the second information, and controls the transceiver to transmit the uplink signal when the UE determines to transmit the uplink signal in the third uplink subframe, wherein the third uplink subframe is one of the first and the second uplink subframes.

* * * * *